United States Patent
Hand

[11] 3,861,719
[45] Jan. 21, 1975

[54] TRANSITION PIPE FITTING

[76] Inventor: James D. Hand, 345 Kepner Dr., Fort Walton Beach, Fla. 32548

[22] Filed: May 9, 1973

[21] Appl. No.: 358,542

[52] U.S. Cl................. 285/47, 285/138, 285/354, 285/331
[51] Int. Cl............................................. F16l 11/12
[58] Field of Search ....... 285/15, 16, 47, 52, 133 R, 285/138, 331, 40, 50, 44, 51, 53, 54, 354

[56] References Cited
UNITED STATES PATENTS

| | | | |
|---|---|---|---|
| 3,018,119 | 1/1962 | Champion.......................... | 285/54 X |
| 3,244,438 | 4/1966 | Bucheit.............................. | 285/15 |
| 3,375,025 | 3/1968 | Engel.................................. | 285/15 |
| 3,596,933 | 8/1971 | Luckenbill......................... | 285/331 |
| 3,659,881 | 5/1972 | Tinsley et al. .................... | 285/331 |
| 3,684,316 | 8/1972 | Lavender............................ | 285/16 |

*Primary Examiner*—Dave W. Arola
*Attorney, Agent, or Firm*—Watson, Cole, Grindle & Watson

[57] ABSTRACT

A pipe fitting for connecting concentric pipes together to a gas meter unit, includes a coupling nut with which the smaller of the pipes is sealingly engaged and a coupling sleeve securing the larger of the pipes to the nut, the larger pipe serving as a protective casing for the smaller one which serves as a gas conduit.

2 Claims, 3 Drawing Figures

PATENTED JAN 21 1975

3,861,719

TRANSITION PIPE FITTING

This invention relates generally to pipe fittings and more particularly to a fitting for interconnecting concentric pipes together to a gas meter unit.

In accordance with recent government regulations, each natural gas meter loop must be insulated from the building piping and all below-ground metal parts of all natural gas service lines must be protected against corrosion. Where plastic pipe is used as underground service lines for the natural gas, the above-ground portion of such lines must be protected against deterioration and external damage and such service lines are not to support external loads. Moreover, the service lines inside the buildings must be protected from external damage, and the service lines must generally be insulated against stray electrical currents from the building piping.

For existing gas service lines usually metallic piping, compliance with this regulation could become quite costly to the gas industry. However, it has brought to light the urgent need for a safer technique on delivering natural gas to the customer without the dangers of corrosion causing leaks in underground piping.

In both new and existing service line constructions, the transition service head fitting of the present invention permits full compliance with the above-mentioned regulations in a simple, economical and highly effective manner. For existing service lines, the metallic piping is used as a protective casing for a smaller diameter plastic pipe located therewithin and interconnecting the gas main with the gas meter unit of the building. In new constructions, the plastic piping is used as the underground conduit and metallic piping of larger diameter is encased thereover for a portion of the length of the conduit extending upwardly beyond the ground surface to the gas meter unit.

It is therefore a principal object of the present invention to provide a transition service head fitting for interconnecting these concentric plastic and metallic pipes together to the gas meter unit, a coupling nut being used to which the plastic pipe is sealingly engaged, and including a coupling sleeve securing the larger of the pipes to the nut.

A further object of the invention is to provide such a sitting which includes means for insulating the larger pipe casing from any stray electric current coming from the customer's building piping.

A further object of this invention is to provide such a fitting wherein the coupling sleeve is sealingly engaged with the larger pipe as in existing constructions.

Other objects, advantages and novel features of the invention will become apparent when the following detailed description of the invention is considered in conjunction with the accompanying drawings wherein.

Figure 1:
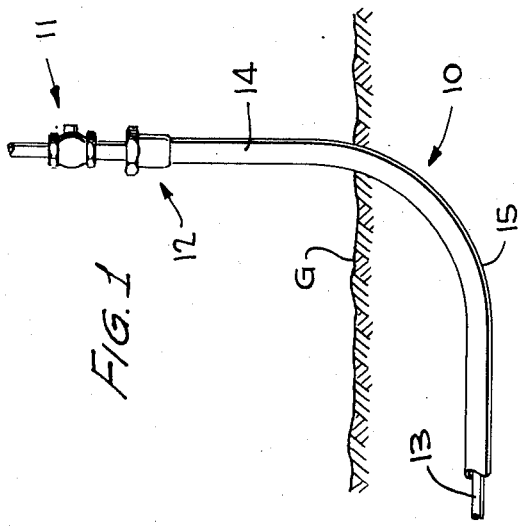
FIG. 1 is an end elevational view showing the portion of the natural gas service line extending upwardly beyond the ground level, the fitting of the invention being installed thereon for both existing and new service line constructions.

Turning now to the drawings wherein like reference characters refer to like and corresponding parts throughout the several views, a portion of a natural gas pipeline 10 is shown in FIG. 1 lying substantially underground and extending from a gas main (not shown). The pipeline rises out of the level of the ground G and is connected to the standard meter lock wing 11 via the transition pipe fitting 12 of the present invention. The meter lock wing is connected to the standard gas meter unit (not shown) affixed to the building.

For new pipeline installations, a pipe 13 of thermoplastic or thermosetting composition is used as the gas conduit extending between the gas main and pipe fitting 12. The last several feet of conduit 13 including its riser portion 14 is encased with a larger diameter metallic pipe 15. The outer diameter of the smaller pipe 13 may be, for example, five-eighths inch and the outer diameter of the larger pipe 15 may be three-fourths inch.

Figure 2:
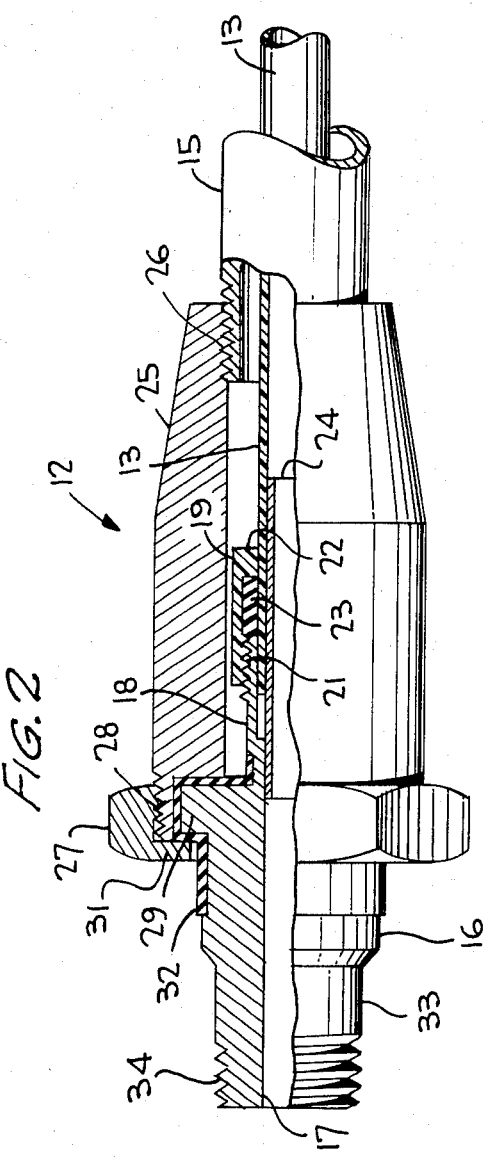
FIG. 2 is a detail view partly in section showing the fitting in accordance with the invention used for new service line constructions.

Concentric pipes 13 and 15 are each interconnected with pipe fitting 12 for new gas line constructions in the manner as shown in FIG. 2. This fitting comprises a coupling nut 16 having an axial bore 17 therein of a diameter substantially throughout the length of the nut equal to the inner diameter of pipe 13. However, the diameter of this bore at the inner end 18 of the coupling nut is equal to the outer diameter of pipe 13 as shown in FIG. 2. One end of pipe 13 is sealingly engaged with this inner end 18 by means of a sealing bushing 19 threadedly engaged with a portion of inner end 18 as at 21. The bushing is of a non-metallic composition such as thermoplastic or thermosetting which further avoids corrosion or any consequent weakening of the seal between pipe 13 and coupling nut. Also, the bushing includes an inwardly directed peripheral flange 22 at one end thereof so that, when the bushing is tightened over the threaded portion of inner end 18, elastic sealing ring 23 is expanded inwardly in a radial direction to effect a tight seal. A cylindrical sleeve or stiffener 24 having an outer diameter equal to the inner diameters of bore 17 and pipe 13, is frictionally engaged with these inner diameter walls. In such manner, sealing ring 19 may be tightly pressed against pipe 13 using the stiffener as a back-up thereby substantially avoiding any leakage at this connection.

Fitting 12 further comprises a coupling sleeve 25 which surrounds inner end 18 of the coupling nut and couples the larger pipe 15 to the nut. One end of the sleeve is internally threaded for threaded engagement with an end of pipe 15 as at 26, and the other end of the sleeve is externally threaded for threaded engagement with a union nut 27 as at 28. Coupling nut 16 has a peripheral shoulder portion 29, and union nut 27 has an inwardly directed peripheral flange 31 for cooperation with this shoulder. Insulation material 32 surrounds a portion of nut 16 so as to be located between flange 31 of the union nut and nut 16, and between a portion of sleeve 25 and the coupling nut so as to insulate the coupled metallic pipe 15 from any stray electric currents coming from the customer's housing piping. Also, the end 33 of the coupling nut opposite inner end 18 thereof is externally threaded as at 34 for engagement with meter lock wing 11 in a customary manner.

Figure 3:
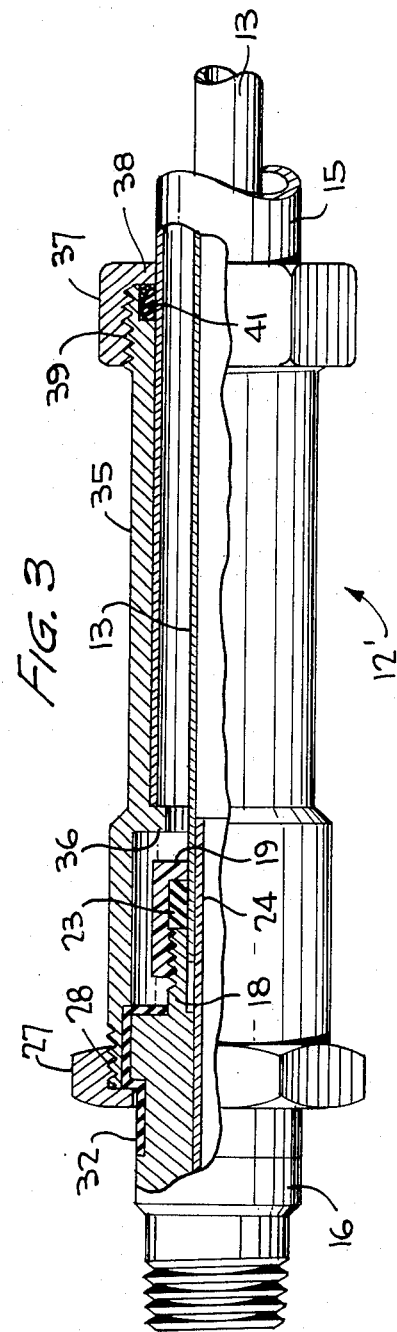
FIG. 3 is a detail view partly in section showing the fitting of the invention used for existing service line constructions.

For existing gas line constructions, the larger metallic pipe 15 normally extends from the gas main to a pipe fitting such as 12. To avoid the need for protecting this pipe 15 against corrosion so as to comply with the aforementioned regulations, pipe 13 may be simply inserted within pipe 15 from the gas main end or from the meter lock wing end without unearthing the ground above the pipe for access thereto. In FIG. 3, it can be seen that the pipe fitting 12' of the present invention as it applies to an existing service line construction, comprises similar elements as described with reference to FIG. 2. For example, coupling nut 16 has an inner end 18 in threaded engagement with the non-metallic sealing bushing 19 of a similar design to that of the FIG. 2 embodiment so that, when tightened over this inner end, sealing ring 23 is inwardly compressed against pipe 13 which is stiffened at its inner end by means of stiffener 24.

In this embodiment, however, a sleeve 35 is provided for coupling together pipe 15 with the coupling nut. Because a sleeve such as 35 was used for coupling the larger diameter metallic pipe 15 with the meter lock wing in existing constructions before installation of plastic pipe 13, sleeve such as 35 had to be sealingly engaged with pipe 15. Accordingly, the major portion of sleeve 35 has an inner diameter equal to the outer diameter of pipe 15 so as to facilitate convenient installation of the sleeve as by sliding it over an end of pipe 15. A peripheral stop flange 36 is therefore provided on the sleeve to limit the extent of overlap between 15 and 35. A union nut 37 having an inwardly directed peripheral flange 38 thereon threadedly engages with sleeve 35 as at 39 so that, as it is tightened thereon, sealing ring 41 will be expanded radially inwardly to effect a tight seal. A union nut 27 similar to that described for the FIG. 2 embodiment is provided for coupling sleeve 35 to coupling nut 16. Insulation 32 is again provided and is disposed in the same manner as in the FIG. 2 embodiment for, again, insulating pipe 15 from any stray electrical currents coming from the customer's house piping.

For both new and existing constructions, it can be seen that the need for any protection of metallic piping 15 against corrosion to comply with those government regulations in this field is substantially avoided by the installation of a plastic inner pipe 13. For new constructions, the outer metallic pipe 15 serves as a protective casing for the last few feet of the line as it rises out of the ground and interconnects with the fitting of the present invention. Casing or pipe 15 in such new constructions therefore serves to support the load for weight of the gas meter unit to some extent, and futhermore protects gas conduit 13 against external damage. Such features are also made requirements in the aforementioned regulations.

For existing constructions, the underground metallic piping 15 remains in place except that it is first disconnected from the gas main so that the inner plastic piping 13 may be installed therewithin. The metallic piping now acts as a protective casing for the entire length of the inner pipe and functions to assist in the support of the load or weight of the gas meter and to protect against external damage in the same manner as described with reference to new constructions.

For both constructions, the meter loop is insulated from the house piping by means of insulation 32 to thereby further comply with the aforementioned regulations. Such insulation used in accordance with the present invention is located below the carrier pipe connection to the meter lock wing valve so that the insulation is not subjected to any gas pressure. Therefore, any cracks in the insulating material, which may be caused by lightning or any other cause, will not permit a gas leak or cause a maintenance problem.

Obviously, many modifications and variations of the present invention are possible in the light of the above teachings. It is therefore to be understood that within the scope of the appended claims, the invention may be practiced otherwise than as specifically described.

What is claimed is:

1. A pipe fitting for interconnecting concentric pipes together to a gas meter unit, comprising: a coupling nut having an axial cylindrical bore therein; a first non-metallic and flexible pipe of a given diameter serving as a gas conduit engaged at one end thereof with one end of said coupling nut; the wall of said bore of said nut being axially aligned with the inner wall of said first pipe; a stiffener sleeve element being in frictional engagement with said inner walls; a portion of the diameter of said wall of said coupling nut bore at said one end thereof being equal to the outer diameter of said first pipe; a sealing bushing surrounding said first pipe and being threadedly engaged with said coupling nut, and an elastic sealing ring disposed between said bushing and said first pipe to effect a sealing engagement thereat as said bushing is tightened; a second metallic pipe of a diameter larger than that of said first pipe and encasing same as a protective casing over at least a portion of the length of said first pipe; a coupling sleeve surrounding said engaged pipe and said coupling nut, said sleeve coupling together one end of said second pipe with said nut; and insulation means disposed between said coupling sleeve and said nut for insulating said second pipe from any stray electric currents coming from the direction of the gas meter unit.

2. The pipe fitting according to claim 1, wherein a union nut surrounds said second pipe and is threadedly engaged with said sleeve, and another elastic sealing ring being disposed between said union nut and said second pipe to effect a sealing engagement thereat as said union nut is tightened.

* * * * *